United States Patent [19]

Yoshioka et al.

[11] 3,920,601

[45] Nov. 18, 1975

[54] PROCESS FOR PREPARING AQUEOUS EMULSIONS OF SYNTHETIC POLYMERIC ELASTOMER

[75] Inventors: Akira Yoshioka; Akira Suzuki; Takaaki Sugimura; Osanori Yamamoto, all of Kawasaki, Japan

[73] Assignee: Nippon Zeon Co., Ltd., Tokyo, Japan

[22] Filed: Mar. 18, 1974

[21] Appl. No.: 451,967

[52] U.S. Cl. 260/29.7 N; 260/29.6 MN; 260/29.6 N; 260/29.6 PM; 260/29.7 EM; 260/29.7 N; 260/29.7 NQ
[51] Int. Cl. .................. C08d 11/04; C08d 5/02
[58] Field of Search 260/29.7 EM, 29.7 N, 29.7 NQ, 260/29.6 N, 29.6 MN

[56] References Cited
UNITED STATES PATENTS

| | | | |
|---|---|---|---|
| 2,443,893 | 6/1948 | Collins | 260/29.7 EM |
| 2,944,040 | 7/1960 | Pollock et al. | 260/29.7 EM |
| 3,310,515 | 3/1967 | Halper et al. | 260/29.7 EM |
| 3,503,917 | 3/1970 | Burke | 260/29.7 EM |

OTHER PUBLICATIONS

Chem. Abs. 54, 14748f.
Chem. Abs. 62, 13344f.

Primary Examiner—Melvin Goldstein
Assistant Examiner—Thomas De Benedictis, Sr.
Attorney, Agent, or Firm—Frank J. Jordan

[57] ABSTRACT

A process for preparing an aqueous emulsion of a synthetic polymeric elastomer from a solution thereof in a hydrocarbon solvent, which comprises mixing together a hydrocarbon solvent solution of a synthetic polymeric elastomer, an organic cyanide compound, water and an emulsifier to form an aqueous emulsion which is, if desired, then freed from the hydrocarbon solvent and the organic cyanide compound by evaporation thereby obtaining an aqueous emulsion of the polymeric elastomer.

5 Claims, No Drawings

PROCESS FOR PREPARING AQUEOUS EMULSIONS OF SYNTHETIC POLYMERIC ELASTOMER

This invention relates to a process for preparing an aqueous emulsion of a synthetic polymeric elastomer from a solution thereof in a hydrocarbon solvent and more particularly it relates to a process for preparing an aqueous emulsion of a synthetic polymeric elastomer by emulsifying a solution of a synthetic polymeric elastomer in a hydrocarbon solvent with the use of water and a suitable emulsifier in the presence of a specific oroganic cyanide compound to form a stable aqueuous emulsion comprising the hydrocarbon solvent solution of the polymeric elastomer, water, the emulsifier and the cyanide compound, and then removing the hydrocarbon solvent and the cyanide compound from the basic emulsion by evaporation without substantial formation of coagulum therein to obtain a desired stable aqueous emulsion of the synthetic polymeric elastomer, the desired stable emulsion being capable of inhibiting the formation of coagulum therein during storage.

Aqueous emulsions of synthetic polymeric elastomers have heretofore been prepared mainly by the use of emulsion polymerization techniques. However, attention has recently been drawn to techniques of preparing such aqueous emulsions by transferring a hydrocarbon solvent solution of a synthetic polymeric elastomer, that is a cement, to an aqueous phase thereof.

As a conventional process for the preparation of such an aqueous emulsion by transfer from a polymer cement to an aqueous phase thereof, there is known a process comprising emulsifying a hydrocarbon solvent solution of a synthetic polyisoprene rubber with an emulsifier and water by means of a homogenizer, high speed colloid mill or the like to form a homogeneous emulsion thereof and secondly removing the solvent (U.S. Pat. No. 3,285,869). This known process, however, is not satisfactory in that the obtained aqueous emulsion containing the polymer and solvent is colloidally unstable and is subject to phase separation into a solvent phase and an aqueous phase.

In addition, U.S. Pat. Nos. 3,305,508 and 3,310,516 disclose that the incorporation of an emulsion with an organic oxygen-containing compound such as an alocohol, ketone or ester will inhibit foaming caused when removing the solvent by evaporation and will also inhibit the formation of a slime comprising separate oil phase containing a water-in-oil phase. However, the organic oxygen-containing compounds used in the processes of said Patents are disadvantageous in that they cannot relatively easily be separated from the aqueous emulsion.

Furthermore, British Pat. No. 1,016,236 discloses that removal of the organic oxygen-containing compounds contained in an aqueous emulsion is achieved by extracting them with a solvent such as a hydrocarbon, halogenated hydrocarbon or carbon disulfide. It is not economically desirable, however, to add such a extraction step to the process since this will make the process complicated.

An object of this invention is to provide a process for preparing a stable aqueous emulsion comprising a hydrocarbon solvent solution of a synthetic polymeric elastomer, an emulsifier, water and an organic cyanide compound from a hydrocarbon solvent solution of the polymeric elastomer.

Another object of this invention is to provide a process for preparing a stable coagulum-free aqueous emulsion of a synthetic polymeric elastomer, from an aqueous emulsion comprising a hydrocarbon solvent solution of a synthetic polymeric elastomer, an emulsifier, water and an organic cyanide compound.

Still another object is to provide a process for preparing a stable coagulum-free aqueous emulsion of a synthetic polymeric elastomer from a hydrocarbon solvent solution thereof.

A further object is to provide such aqueous emulsions.

It has been found that these objects are simultaneously attained by allowing a specific organic cyanide compound to be present in an emulsion obtained by emulsifying a hydrocarbon solvent solution of a synthetic polymeric elastomer with water and an emulsifier, thereby to obtain a basic aqueous emulsion which is, if desired, freed from the hydrocarbon solvent and cyanide compound to obtain a final emulsion.

The process of this invention comprises forming a basic aqueous emulsion containing a hydrocarbon solvent solution of a synthetic polymeric elastomer, an organic cyanide compound having a boiling point of not higher than 200°C, an emulsifier and water and, if desired, removing the hydrocarbon solvent and organic cyanide compound by evaporation from the basic aqueous emulsion to prepare a final aqueous emulsion of the synthetic polymeric elastomer.

According to this invention, an aqueous emulsion containing a hydrocarbon solvent solution of a synthetic polymeric elastomer is made colloidally stable and is inhibited to cause phase separation and coagulum formation in the emulsion by the presence of an organic cyanide compound therein. The organic cyanide compound is one which can easily be removed from the aqueous emulsion at the same time when the hydrocarbon solvent is removed therefrom by evaporation.

The organic cyanide compounds used in this invention having a boiling point of not higher than 200°C at atmospheric pressure and a cyano group in the molecule, and they include saturated aliphatic cyanides such as acetonitrile, ethyl cyanide, propyl cyanide, butyl cyanide and amyl cyanide; unsaturated aliphatic cyanides such as acrylonitrile, crotonitrile, allyl cyanide, methacrylonitrile and fumaronitrile; aromatic cyanides such as benzonitrile; alicyclic cyanide such as cyclopropyl cyanide and cyclopentyl cyanide; halocyanides which are derivatives of said cyanides; and aminocyanides. Among these cyanides, those having a boiling point of preferably not higher than 150°C, more preferably not higher than 100°C, are recommendable. The use of cyanide compounds having a higher boiling point is not desirable since such compounds when used in a latex are difficult to perfectly remove from the latex by evaporation, the polymeric elastomer contained in the latex may be denatured at such high temperatures at which the cyanide compounds boil and a disadvantage is incurred from the view-point of heat economy.

The organic cyanide compounds according to this invention should more preferably have a water solublity of 0.1–30 cc/100 cc of water at 20°C, and those having such solubility are useful in stabilizing the basic emulsion colloidally. Typical of these preferable cyanide compounds is acrylonitrile.

These cyanide compounds may be used individually or in combination; however, it is desirable that they be used individually from the standpoint of the ease of their recovery and reuse.

The organic cyanide compounds may be used in amounts of 1–100 parts, preferably 10–30 parts, by weight per 100 parts by weight of the hydrocarbon solvent solution of the polymeric elastomer. The use of the cyanide compound in amounts of less than one part by weight will not exhibit the effect of this invention, and the use thereof in amounts of more than 100 parts by weight will not further enhance the effect of this invention thus making such use uneconomical. These cyanide compounds may be added at any time before or during emulsification, and they may be added all at once in a predetermined amount or in portions.

The synthetic polymeric elastomers that are dissolved in a hydrocarbon solvent according to this invention include homopolymers and interpolymers of conjugated diolefins such as butadiene, isoprene and piperylene; diene rubbers selected from the group consisting of copolymers prepared from said conjugated diolefins and vinyl monomers copolymerizable therewith such as styrene, methyl methacrylate and acrylonitrile; ethylene-α-olefin copolymer rubbers; polypentenamer; petroleum resins or hydrocarbon resins prepared by the polymerization of a fraction containing unsaturated hydrocarbons; and homopolymers and copolymers of an alkylene oxide and/or epichlorohydrin. Those prepared by the practice of solution polymerization in a hydrocarbon solvent are particularly preferable, and the aforesaid diene rubbers are preferable.

The hydrocarbon solvents which may be used in this invention are the same as used in the production of said synthetic polymeric elastomer, and they include aliphatic, alicyclic and aromatic hydrocarbons such as butane, pentane, cyclopentane, hexane, cyclohexane, octane, benzene, toluene and xylene, as well as halogenated hydrocarbons such as methyl chloride, methylene chloride, chloroform, carbon tetrachloride and trichloroethane.

In addition, the hydrocarbon solution of the synthetic polymeric elastomer may be substituted not only with a polymer solution, so-called cement, produced by an ordinary solution polymerizing method but also with a polymer solution prepared by dissolving in a hydrocarbon solvent an elastomer obtained by an ordinary bulk polymerization, emulsion polymerization or suspension polymerization. In practice there may preferably be used as a rubber cement obtained by the solution polymerization of a conjugated diolefin such as butadiene or isoprene.

In a hydrocarbon solution of the synthetic polymeric elastomer, the elastomer may preferably be contained in amounts of about 5 to about 50% by weight of the solution. Said solution may desirably have a viscosity of not more than 10,000 centipoise. In a hydrocarbon solution of the aforesaid petroleum resin, the resin may be contained in amounts of up to 80% by weight of the solution.

Water may be used in a hydrocarbon solution of the elastomer in amounts of 50–200 parts by weight per 100 parts by weight of the solution.

The emulsifiers used herein are not particularly limited and they may include various known types of emulsifiers, among which anionic, non-ionic and anionic-non-ionic mixed type surface-active agents are particularly preferable. These emulsifiers may be used in a hydrocarbon solution of the synthetic polymeric elastomer in amounts of 1–20%, preferably 2–10%, by weight of the elastomer. The emulsifiers are usually dissolved in water and then added to the hydrocarbon solvent solution, or else they may be added to a mixture of the hydrocarbon solvent solution and water.

As mentioned before, the process of this invention comprises closely admixing a cement, that is a solution of a synthetic polymeric elastomer in a hydrocarbon solvent, an emulsifier, water and an organic cyanide compound to form a basic emulsion and then removing the hydrocarbon solvent and organic cyanide compound by evaporation to obtain a final aqueous emulsion of the synthetic polymeric elastomer. These components are usually charged or fed into a mixing vessel in the following manner. In the preparation of the basic aqueous emulsion according to this invention, the components for the emulsion may be mixed together at temperatures of preferably 2°–100°C, more preferably 5°–50°C, and the upper temperature limit used is necessarily limited to that below the decomposition temperature of the starting materials used. In the preparation of the final aqueous emulsion from the basic one, the steam for the evaporation may be saturated or unsaturated one and, for example, a saturated steam at about 100°C may be blown into the basic aqueous emulsion until the hydrocarbon solvent is confirmed to have substantially wholly been removed therefrom by evaporation.

The cement previously prepared and organic cyanide may be charged in admixture into the sliding vessel, and the emulsifier and water may be charged in the form of an aqueous solution of the emulsifier thereinto; otherwise, the cement may singly be charged into the vessel, and the organic cyanide compound, emulsifier and water may be charged thereinto in the form of an aqueous solution of the cyanide compound and emulsifier. The components may also be charged into the vessel separately from each other.

According to this invention, the components for a basic aqueous emulsion may be mixed with each other usually by the use of a homogenizer, high-speed colloid mill, turbo-mixer or the like, and it is necessary to homogeneously emulsify said components under vigorous agitation thereby obtaining the basic aqueous emulsion, in order to minimize the amount of coagulum formed in the final aqueous emulsion to be obtained from the basic aqueous emulsion by removing the hydrocarbon solvent and cyanide compound. The steps of mixing, preparation of the basic aqueous emulsion, and evaporation of the hydrocarbon solvent and organic cyanide compound, according to this invention, may be carried out batchwise or continuously. In cases where the final aqueous emulsion according to this invention is desired to be obtained as a highly concentrated one, the concentration may be conducted by centrifugalization, heating or evaporation under a reduced pressure. The final aqueous emulsion is usually adjusted so that it contains 30–70% by weight of solid matter. The final emulsions thus obtained, depending on the characteristics of the synthetic polymeric elastomer contained therein, may be used for carpet backings, as foam rubbers, rubber threads and binders, and for impregnating tire cords, paper and fibers therewith, as well as for being dip molded into gloves and coating cloths therewith.

This invention will be further explained by reference to the following examples in which all the percentages and parts are by weight unless otherwise specified.

EXAMPLE 1

A cis-1,4-polyisoprene (cis content, 98%) having a Mooney viscosity of 70 was dissolved in hexane to form a 10% hydrocarbon solvent solution of the polyisoprene. One hundred parts of the polyisoprene solution were incorporated with 135 parts of water containing 0.4 parts of potassium oleate and with 15 parts of acrylonitrile to form a mixture which was then emulsified at room temperatures by the use of a T. K. Homomixer (produced by Tokushu Kika Kogyo Co., Ltd.). The T. K. Homomixer used had a rotation velocity of 15,000 rpm and the emulsification was completed in three minutes. The basic emulsion so obtained could if necessary be allowed to stand for at least one week without phase separation and formation of a separated solvent phase with water drops dispersed therein (that is a water-in-oil type slime). To this emulsion steam was allowed to be blown therethrough to remove the hydrocarbon solvent therefrom. The amount of coagulum formed during this stripping operation was 1.2% by weight, based on the rubber solid matter. In contrast, an emulsion prepared without addition of acrylonitrile formed about 30 parts of slime after the lapse of only one day and further formed, at the time of stripping, 25.8% by weight of coagulum, based on the rubber solid matter.

EXAMPLES 2–8

The procedure of Example 1 was followed except that the acrylonitrile was substituted by each of the other organic cyanide compounds shown in Table 1 and except that the Homomixer was oeprated at 10,000 rpm in Examples 4, 7 and 8. The results are shown in Table 1.

Table 1

| Example No. | Cyanide compound added | Stability in storage of basic emulsion one day after emulsification * | Coagulum formed at the time of removal of solvent (wt.%) based on total solid matter in final emulsion |
|---|---|---|---|
| (Ex. 1) | Acrylonitrile | A | 1.2 |
| Ex. 2 | Propyonitirle | B | 1.4 |
| Ex. 3 | Acetonitrile | B | 6.1 |
| Ex. 4 | Methacrylonitrile | B | 4.2 |
| Ex. 5 | Crotonitrile | A | 1.5 |
| Ex. 6 | Dimethylaminopropyonitrile | B | 3.5 |
| Ex. 7 | Benzonitrile | B | 6.8 |
| Ex. 8 | Benzylnitrile | B | 7.6 |
| Comparative example 1 | None | C | 25.8 |

* Estimation of stability in storage was made on the following bases.

A : It is to be appreciated that the basic emulsion causes some cream formation in its uppermost layer, but that the cream-formed emulsion can be made homogeneous again by the application of a gentle agitation thereto.

B : It is to be appreciated that the basic emulsion is appreciated to causes some cream formation in its uppermost layer and to causes partial separation of the water phase in its lowermost layer, but the cream-formed emulsion can be made homogeneous again by the application of a gentle agitation thereto.

C : The basic emulsion produces therein a water-in-oil type slime in amounts of not less than 10% by volume of the emulsion, and the slime-produced emulsion can not be made homogeneous again by the application of a gentle agitation thereto. The latter emulsion can never be made homogeneous again without application thereto of a strong forced agitation by the use of an emulsifying apparatus such as a Homomixer.

The results shown in Table 1 indicate that various organic cyanide compounds are effective in stabilizing the basic emulsion according to this invention, and that they form coagulum in less amounts at the time of removal of the hydrocarbon solvent.

EXAMPLES 9–12

The procedure of Example 1 was followed with the exception that the 0.4 parts of potassium oleate as the emulsifier were replaced by 0.5 parts of each of the emulsifiers as shown in Table 2. The results are indicated in Table 2.

Table 2

| Example No. | Cyanide compund added | Emulsifier added | Stability in storage one day after emulsification | Amount of coagulum formed at the time of removal of solvent (wt.%) based on total solids in emulsion |
|---|---|---|---|---|
| 9 | Acrylonitrile | Sodium dodecylbenzene-sulfonate | A | 2.1 |
| 10 | " | Sodium laurylsulfate | A | 0.7 |
| 11 | " | Ammonium laurylsulfate | A | 0.9 |
| 12 | " | Sodium polyoxyethylene-alkylenesulfate | A | 0.1 |

The emulsions containing any one of the emulsifiers and no acrylonitrile had a storage stability estimated at "C" and produced about 15–25% of coagulum when removing the hydrocarbon solvent therefrom.

EXAMPLES 13–16

In each of Examples 13–15 the procedure of Example 1 was repeated except that the acrylonitrile was added in two portions, one portion before, and the other during, the mixing under agitation. In Example 16, the aforesaid procedure was followed except that the acrylonitrile was wholly added at a time during the emulsification. The results are shown in Table 3.

Table 3

| Example No. | Acrylonitrile added (wt.%) before emulsification | Acrylonitrile added (wt.%) during emulsification | Stability in storage one day after emulsification | Amount of coagulum formed at the time of removal of solvent |
|---|---|---|---|---|
| 13 | 11.3 | 3.7 | A | 2.8 |
| 14 | 7.5 | 7.5 | A | 1.3 |
| 15 | 3.7 | 11.3 | A | 0.7 |
| 16 | 0 | 15.0 | A | 3.7 |

EXAMPLE 17

The procedure of Example 1 was followed with the exception that a solution of polyisoprene in benzene was used. The results are that the basic emulsion obtained had a satisfactory storage stability (estimated at "A") and formed 2.1% of coagulum at the time of removal of the solvent. In comparison with this, the non-use of acrylonitrile in such emulsification gave emulsions having an unsatisfactory storage stability (estimated at "C"), and these emulsions formed 15.8% of coagulum at the time of removal of the solvent.

EXAMPLE 18

Six hundred and ninety parts of a n-butane solution containing 11.0% of a cis-1,4-polyisoprene (Mooney viscosity, 85; cis content, 98%) were incorporated with 90 parts of acrylonitrile and 500 parts of an aqueous solution containing 1.5 parts of potassium oleate and 1.5 parts of a modified potassium rosinate to form a mixture which was then agitated for 10 minutes by using a pressure-proof T. K. Homomixer (9,100 rpm) thereby obtaining a stable emulsion. Through the basic emulsion so obtained steam was blown in in order to remove therefrom the solvent, with coagulum being produced in the amount of 0.8% by weight of the total rubber solids in the emulsion.

EXAMPLES 19–23

The procedure of Example 1 was followed except that the cis-1,4-polyisoprene having a Mooney viscosity of 70 (cis content, 98%) was replaced by each of the following polymeric elastomers and that the solvents and the elastomer concentrations were used as shown in Table 4.

EXAMPLE 19

Cis-1,4-polyisoprene (IR) having a Mooney viscosity of 90 (cis-1,4 content, 98%).

EXAMPLE 20

Cis-1,4-polybutadiene (BR) having a Mooney viscosity of 35 (cis-1,4 content, 97%).

EXAMPLE 21

Styrene-isoprene block copolymer (SIS) having an intrinsic viscosity of 1.1 (toluene solution, 30°C) and a styrene content of 15%.

EXAMPLE 22

Trans-polypentenamer (TPP) being prepared using an Al/W catalyst according to U.S. Pat. No. 3,458,489 and having a Mooney viscosity of 120, trans content of 87% and intrinsic viscosity of 3.1 (toluene solution, 30°C).

EXAMPLE 23

Petroleum resin (supplied under the trade name of Wingtack 95 by Goodyear Co.), melting point 95°C, (PR).

The results are shown in Table 4.

Table 4

| Example No. | 19 | 20 | 21 | 22 | 23 |
|---|---|---|---|---|---|
| Polymeric elastomer | IR | BR | SIS | TPP | PR |
| Solvent | Benzene | Hexane | Benzene | Hexane | Hexane |
| Concentration of elastomer in solution (wt.%) | 10.0 | 12.7 | 7.7 | 10.1 | 34.2 |
| Stability in storage one day after emulsification | A | A | A | B | B |
| Amount of coagulum formed at the time of removal of solvent | 2.4 | 3.3 | 1.3 | 4.9 | 2.7 |

The results obtained with comparative emulsions containing no acrylonitrile are indicated in the following table.

| Comparative example | 2 | 3 | 4 | 5 | 6 |
|---|---|---|---|---|---|
| Stability in storage one day after emulsification | C | C | B | C | C |
| Amount of coagulum formed at the time of removal of solvent (wt.%) | 15.9 | 10.2 | 14.6 | 17.5 | 10.2 |

What is claimed is:

1. In a process for the preparation of an aqueous emulsion containing a synthetic polymeric elastomer, wherein water, an emulsifier, and a hydrocarbon solvent solution of said synthetic polymeric elastomer are admixed to form a basic aqueous solution and the solvent is removed from the resultant basic aqueous emulsion by evaporation to obtain the final aqueous emulsion, the improvement comprising further adding an organic cyanide compound to the admixing step, whereby the organic cyanide compound prevents said basic emulsion from separating into phases; removing from the basic emulsion, by evaporation, said hydrocarbon solvent simultaneously with said organic cyanide compound, thereby inhibiting coagulum formation; and recovering the final aqueous emulsion.

2. A process according to claim 1 wherein the organic cyanide compound is a compound selected from the group consisting of acrylonitrile, acetonitrile, ethyl cyanide, propyl cyanide, butyl cyanide, amyl cyanide, crotonitrile, allyl cyanide, methacrylonitrile, fumaronitrile, benzonitrile, cyclopropyl cyanide, cyclopentyl cyanide, and halocyanides and amino cyanides thereof.

3. A process according to claim 1, wherein the hydrocarbon solvent solution contains the synthetic polymeric elastomer in amounts of 5–50% by weight thereof.

4. A process according to claim 1, wherein the water component is used in amounts of 50–200 parts by weight per 100 parts by weight of the hydrocarbon solvent solution of the synthetic polymeric elastomer.

5. A process according to claim 1, wherein the synthetic polymeric elastomer is polyisoprene.

* * * * *